Nov. 22, 1949 — R. H. GALBREATH — 2,489,178
V-BELT SHEAVE
Filed Jan. 9, 1947
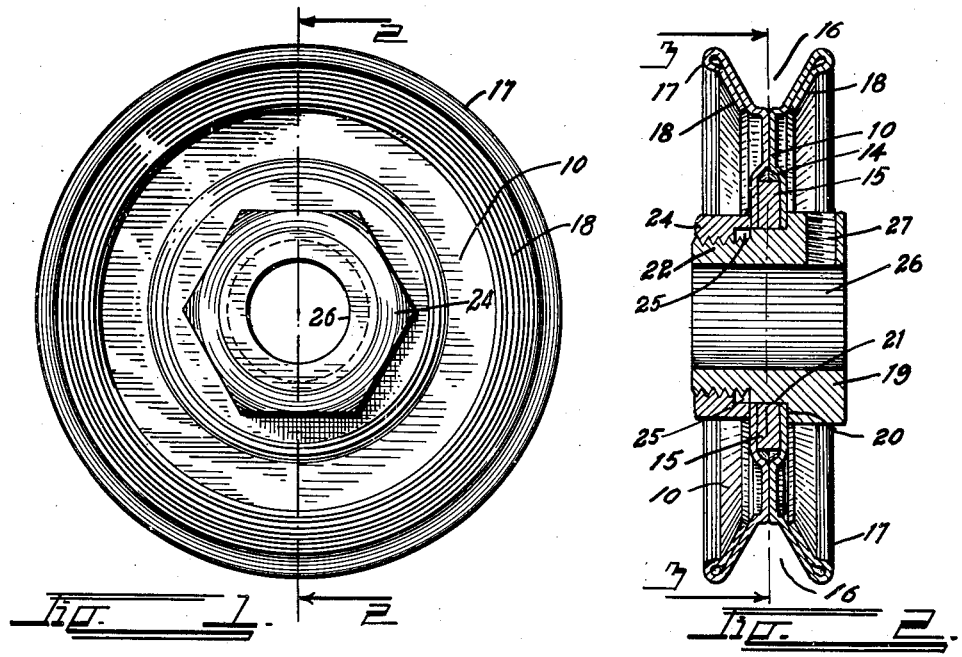
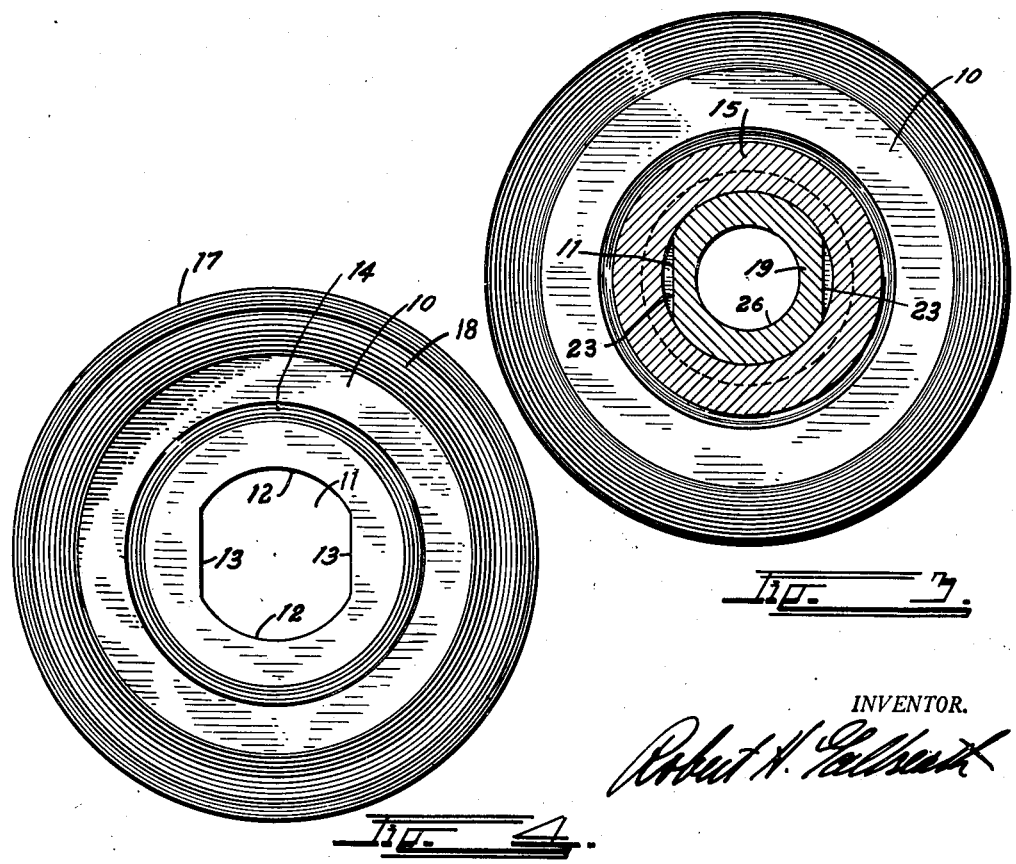
INVENTOR.
Robert H. Galbreath Patented Nov. 22, 1949

2,489,178

UNITED STATES PATENT OFFICE 2,489,178

V-BELT SHEAVE

Robert Harvey Galbreath, Denver, Colo., assignor to Howry-Berg Steel & Iron Works, Denver, Colo.

Application January 9, 1947, Serial No. 720,979

1 Claim. (Cl. 74—230.14)

This invention relates to a V-belt pulley or sheave, and has for its principal object the provision of a sheave construction in which the shaft hub can be quickly and easily assembled to form sheaves of various diameters to accommodate shafts of various sizes.

Another object of the invention is to provide a demountable hub construction for V-belt sheaves which will develop a maximum torque resistance between the hub and the sheave; which will automatically accommodate varying thicknesses in the metal of the sheave parts; which will employ two identical stamped steel plate parts to form the sheave; and in which all of the hub parts can be cheaply and efficiently manufactured as screw machine products.

A further object of the invention is to provide a groove construction for V-belt sheaves which will have a rounded, smooth edge for safety reasons, and which will have a double wall thickness at the belt groove for structural reasons.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of a V-belt sheave, showing the new construction;

Fig. 2 is a vertical cross-section therethrough, taken on the line 2—2, Fig. 1;

Fig. 3 is a section taken on the line 3—3, Fig. 2; and

Fig. 4 is a side view of a circular metal stamping forming one-half of the wheel portion of the improved V-belt sheave.

The wheel portion of the improved sheave consists of two identically similar parts having a contour as shown in Fig. 4. Each part comprises a circular disc 10 of sheet or plate metal having a central hub opening 11 of a non-circular outline. The preferred hub opening is shown in Fig. 4 and consists of two concentric arcuate sides 12, separated by two parallel flat sides 13.

The portion of the disc around the opening 11 is indented, as shown at 14, so that when two of these discs are together, a circular receiving socket will be formed around the opening 11 for the reception of an annular spacing washer 15.

The periphery of the disc 10 is flared outwardly to form one-half of a V-belt receiving groove 16 when two discs are together. The peripheral edge of each disc is rolled back upon itself to form a smooth circular bead 17, and thence is extended inwardly on an incline to form a double wall 18 for the groove 16.

The discs 10 are mounted on a demountable hub 19 having a shaft bore 26 of any desired diameter. The hub consists of an enlarged shoulder portion 20, a non-circular mounting portion 21 of less diameter than the shoulder portion 20, and a threaded portion 22 of less diameter than the mounting portion 21.

The shoulder portion may be provided with a set screw socket 27, or other shaft-engaging means. The shape of the mounting portion 21 is such as will fit snugly into the disc openings 11, it being provided with two flat sides 23 for fitting against the two flat sides 13 of the opening. The threaded portion 22 is designed to receive a threaded nut 24 which is preferably, but not necessarily, of a hexagonal outline.

The inner face of the nut 24 is recessed, as shown at 25, the diameter of the recess slightly exceeding the diameter of the mounting portion 21 so that a portion of the nut 24 may extend over the mounting portion 21.

The sheave is assembled by placing one of the discs 10 over the mounting portion 21 against the shoulder portion 20. The annular spacing washer 15 is then placed over the portion 21 and covered by a second disc 10. The two discs 10 are faced in opposite directions to form the socket for the washer 15, and to form the complete V-belt groove 16. The entire assembly is then clamped in place by tightening the nut 24 on the threaded portion 22.

The width of the mounting portion 21 is substantially equal to the total thickness of two of the discs 10 plus the thickness of the washer 15. It is not essential, however, that these be in accurate correspondence, for should the assembly of discs and washers be slightly less than the width of the portion 21, the nut 24 can pass over the latter to vertically engage the outer disc 10. On the other hand, if the thickness of the assembly exceeds the width of the portion 21, the nut 24 can still act to clamp the assembly in concentric relation.

The sheaves are supplied to the trade as a plurality of the discs 10 of various diameters, all having the same sized hub opening 11. A variety of the hubs 19 are supplied having various diameters of shaft bores 26, but all having the same outer diameters and contours. The dealer can then quickly assemble the parts to provide sheaves of any desired diameter for any given shaft size.

While a specific form of the improvement has been described and illustrated herein, it is desired to be understood that the same may be varied within the scope of the appended claim, without departing from the spirit of the invention.

Having thus described the invention, what is claimed and desired secured by Letters Patent is:

A sheave comprising a wheel having a non-circular opening through its center and formed of duplicate side discs having portions surrounding the center opening and spaced from each other and forming a pocket, a thick ring of stiff metal fitting snugly in the pocket, a hub bored longitudinally and passed longitudinally through the center opening of the wheel, said hub being formed of hard metal and having an intermediate portion conforming externally to the non-circular opening of the wheel and fitting snugly therein, one end portion of the hub being externally of increased diameter and forming a head having an inner side face constituting a shoulder extending circumferentially about the hub and bearing against one side disc, the other end portion of the hub being of reduced diameter and externally threaded, and a nut screwed upon the threaded end portion of the hub and at its inner end being of internally reduced diameter to form an annular recess into which the adjacent end portion of the hub about which the wheel fits is snugly received, said inner end of the nut being in gripping engagement with the second disc of the wheel and causing the wheel to be firmly gripped between the nut and the shoulder, said nut being adapted to apply pressure to hold the discs and the ring forming the wheel in close contacting engagement with each other.

ROBERT HARVEY GALBREATH.

REFERENCES CITED

The following references are of record in the file of this patent:

UNITED STATES PATENTS

| Number | Name | Date |
|---|---|---|
| 1,832,871 | Meyer | Nov. 24, 1931 |
| 2,188,953 | Mitchell | Feb. 6, 1940 |

FOREIGN PATENTS

| Number | Country | Date |
|---|---|---|
| 373,080 | Germany | Apr. 7, 1923 |